Nov. 14, 1939.　　　D. HEYER　　　2,179,933
VARIABLE SPEED TRANSMISSION DEVICE
Original Filed Aug. 26, 1935　　3 Sheets-Sheet 1
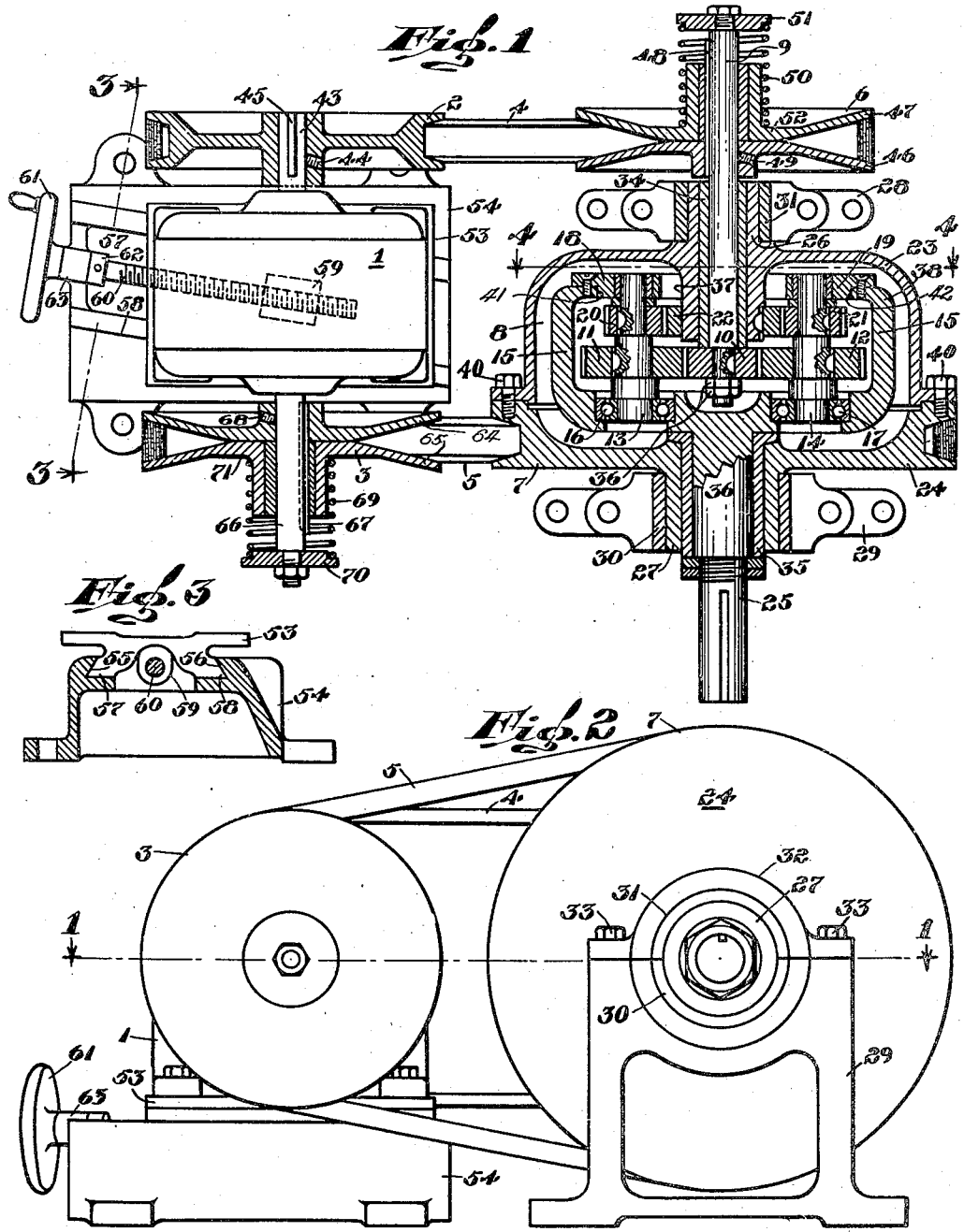
INVENTOR
Don Heyer
BY John Flam
ATTORNEY

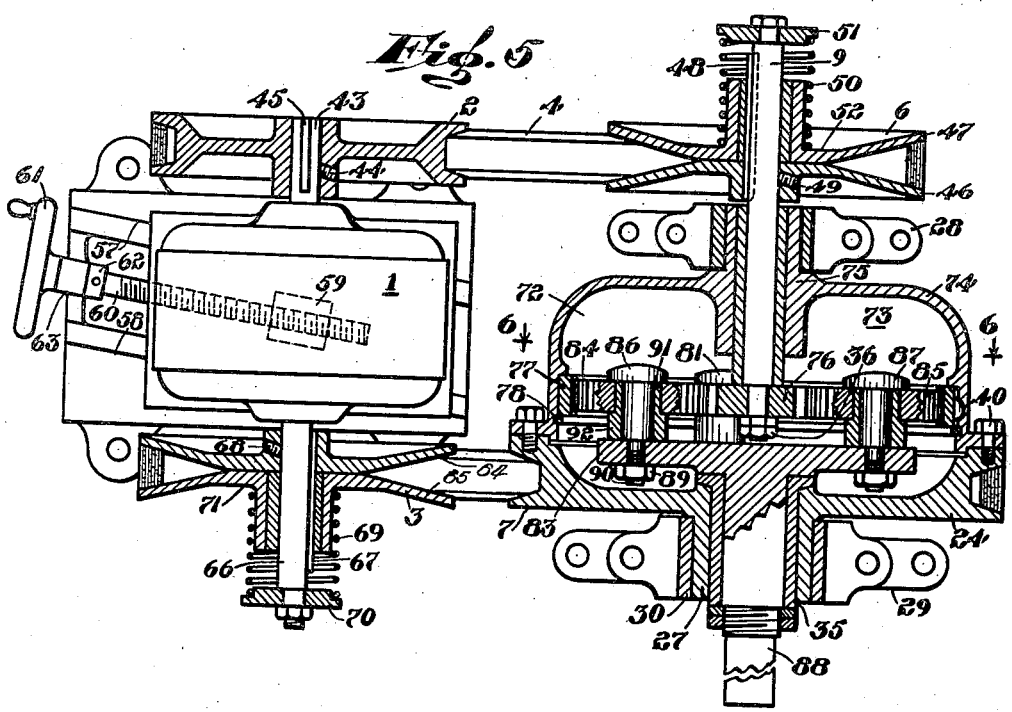

Nov. 14, 1939.　　　　　D. HEYER　　　　　2,179,933
VARIABLE SPEED TRANSMISSION DEVICE
Original Filed Aug. 26, 1935　　3 Sheets-Sheet 3

INVENTOR.
Don Heyer
BY John Flam
ATTORNEY.

Patented Nov. 14, 1939

2,179,933

UNITED STATES PATENT OFFICE 2,179,933

VARIABLE SPEED TRANSMISSION DEVICE

Don Heyer, Los Angeles, Calif., assignor to U. S. Electrical Motors Inc., Los Angeles, Calif., a corporation of California Application August 26, 1935, Serial No. 37,960
Renewed May 7, 1938

16 Claims. (Cl. 74—286)

This invention relates to a source of variable speed power for driving machines, which require a wide variation in driving speed, and more particularly to an integral construction incorporating a driving electric motor and a variable speed ratio transmission for transmitting power from the driving electric motor to a load driving shaft.

In this invention the variation in speed is obtained by means of a belt and pulley drive, including a driving pulley structure, a driven pulley structure, and a belt for transmitting power between the pulley structures, at least one of the pulley structures having an adjustable effective diameter, whereby the variation in speed ratio is obtained.

Such an adjustable pulley structure may include a pair of pulley sections having opposed inclined faces, forming a seat for a wedge-shaped driving belt. In order to provide means for adjusting the effective diameter of the pulley structure, the pulley sections are made relative axially adjustable. In this way, the inclined faces can be brought closer together, causing the belt to be urged radially outward to produce an increased effective diameter; or they can be separated, causing the belt to contact with the inclined faces at a shorter radial distance to produce a decreased effective diameter.

The variation in effective diameter and thus the variation in speed ratio, which may be obtained by the use of such an adjustable pulley structure, is determined by the practical width of the belt, the belt velocity, and the maximum and minimum effective diameters over which the belt may be operated at the speed of rotation of the pulley structure. The minimum effective diameter of the adjustable pulley structure is determined by the minimum diameter over which the belt may be operated at the peripheral velocity corresponding to the effective pulley diameter and the rate of rotation. For the belt will fail, if it is operated over too small a pulley diameter, due to the shearing stresses produced within the belt, when the belt is bent around the pulley. The maximum effective diameter of the adjustable pulley structure is determined by the thickness and width of the belt and the peripheral velocity at which the belt may be operated without failure. The variation in effective diameter which may be obtained in any single pulley construction is also determined by the maximum width of the belt, which may be used without failure of the belt due to lateral buckling. For if too wide a belt is used the belt will buckle due to the lateral pressure of the pulley faces on the belt sides. It is thus obvious that the variation in speed, which may be obtained by means of an adjustable pulley structure is limited, and that it is never possible to adjust the speed to zero or to reverse the direction of rotation by a mere variation in the relative diameters of the driving and driven pulleys.

It is one of the objects of this invention to make it possible to vary the speed of a driven shaft to zero, in a continuous manner, and during continuous operation of the source of power.

The possibility of providing such a wide variation in speed renders the application of such systems practicable for all kinds of loads. For example, the speed of a printing press drive must be capable of varying from a high speed down to a very low speed, corresponding to the "make-up speed" and "operating speed". Another application for such a variable speed system is offered by machines having a large inertia and which it is desirable to bring up to speed gradually. The present invention makes it possible to start the driving motor, with the speed of the load driving shaft adjusted to zero, after which the speed of the load driving shaft may be gradually adjusted to bring the driven machine to the required speed. The invention finds further application in driving compressors for refrigerating systems, or fans for ventilating systems, in which the demand placed on the driven machine is variable. In driving machines of this type it has been common practice to operate the machine intermittently in accordance with the varying demand placed on the driven machine. That type of operation requires a frequent starting and stopping of the driving motor, which requires motors of large horsepower and rugged and expensive control equipment. By the aid of the present invention, the speed of the load driving shaft may be adjusted to provide the speed required by the demand placed on the driven machine, and if necessary, the speed of the load driving shaft may be adjusted to standstill, thereby obviating the necessity of stopping the operation of the driving motor.

It is accordingly, another object of this invention to provide a variable speed drive of this character in which the variation in speed is obtained by the aid of a variable diameter pulley structure.

The wide variation in speed is secured by the provision of a differential gear mechanism, having two actuating members and a driven member, which is in driving relation to a load driving shaft. The speed of the load driving shaft is adjusted by varying the relative speeds at which the actuating members are operated. In such a differential gear mechanism the power delivered to the load driving shaft is the difference between the power delivered to one of the actuating members and the power removed from the other actuating member. When the speed of operation of the actuating members is made such that the power delivered to one of the actuating members is equal to the power removed from the other actuating member, the load driving shaft is brought to a standstill. One of the actuating members may be driven at a constant speed, and the other at a variable speed, such as that obtained by a variable diameter pulley drive. However, a greater variation in the speed of the load driving shaft may be obtained, and the maximum torque on the differential gear mechanism reduced, by driving both of the actuating members at variable speeds.

It is accordingly still another object of this invention to provide an adjustable speed differential drive, in which means are provided for adjusting the speeds of both of the actuating members of the differential gear mechanism.

The variable speed drive, employed for varying the relative speeds of the actuating members of the different gear mechanism, may have two adjustable diameter pulley structures; or it may include one adjustable pulley structure and one pulley having a fixed effective diameter. When two adjustable pulley structures are employed, the pulleys are arranged to be oppositely adjustable; that is, an increase in the effective diameter of one of the pulley structures is accompanied by a compensating decrease in the effective diameter of the other pulley structure. In that case the adjustment of the two pulleys must be so interlocked that they are simultaneously adjusted to the diameters required by the driving belt, which is of constant length. The use of such interlocking means requires that the driving and driven pulleys be adjacently located with respect to each other, and that they be accessible to the interlocking means. The adjustment of both pulleys also requires that the two pulleys be adjusted at variable relative rates dependent on the particular values of the effective pulley diameters and of the belt lengths.

There are many variable speed power applications, for which it is not convenient to adjacently locate the driving and driven pulleys. This is particularly true when the driving pulley structure is directly mounted on the shaft of the driving motor. For many occasions arise, when there is not sufficient space available to provide a common support for both the differential gear mechanism, driven by the driven pulley structure, and the driving electric motor and driving pulley structure.

The device to be described hereinafter is of particular utility in such instances. However, it may also be employed with equal success, when the two pulley structures are adjacently located. In the form of the variable speed drive employed in this device means are provided for adjusting the effective diameter of only one of the pulley structures. The other pulley structure may be of fixed diameter and of the type commonly employed in V belt drive. In this construction the belt may be adjusted to the relatively adjustable pulley diameters by means of a compensating variation in the center distance between the axes of the two pulley structures.

In order to provide a common source of power for driving both of the actuating members of the differential gear mechanism, a pair of pulley structures is mounted on the shaft of a driving electric motor. These pulley structures are connected by a pair of belts with a second pair of pulley structures which are respectively in driving relation to the two actuating members of the differential gear mechanism. To provide means for adjusting the center distance in accordance with the requirements of the adjustable diameter pulley, the electric motor, together with the pulley structures driven thereby, are adjustably mounted on a movable base.

It is accordingly still another object of this invention to provide an adjustable speed differential drive, in which the driving motor may be remotely supported from the differential gear mechanism, and in which the differential gear mechanism may be driven by pulley structures, which are in direct driving relation to the actuating member of the differential gear mechanism It is still another object of this invention to provide a variable speed differential drive, in which both of the actuating members of the differential gear mechanism may be driven in the same direction, to reduce the load imposed on the gears and to increase the power capacity of the drive This invention possesses many other advantages, and has other objects which may be made more easily apparent from a consideration of several embodiments of the invention. For this purpose there are shown a few forms, in the drawings accompanying and forming a part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a plan view, partly in section, of a variable speed differential drive, embodying the invention;

Figure 2 is a side elevation, taken from the front of Figure 1;

Figure 3 is a vertical sectional view, taken along the plane 3—3 of Figure 1;

Figure 4 is a vertical sectional view, taken along the plane 4—4 of Figure 1;

Figure 5 is a plan view, partly in section, of another form of variable speed differential drive, embodying the invention;

Figure 6 is a vertical sectional view, taken along the plane 6—6 of Figure 5;

Figure 7:
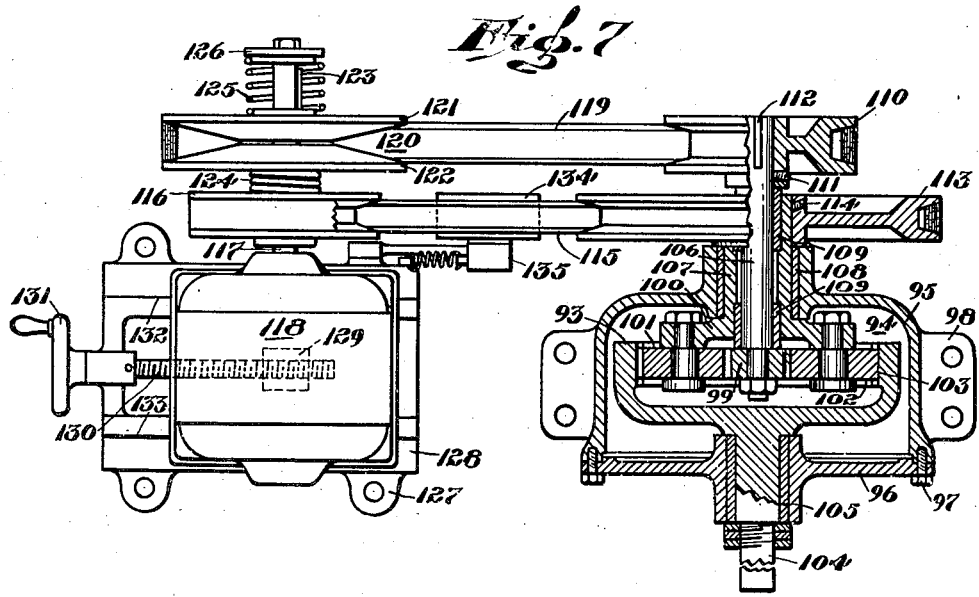
Figure 7 is a plan view, partly in section, of another form of variable speed differential drive, embodying the invention.

Referring more particularly to the form of the invention disclosed in Figures 1 to 4, inclusive, the variable speed drive includes the driving electric motor 1, which by means of the pulley structures 2 and 3 and the belts 4 and 5 drives the pulley structures 6 and 7, which are in driving relation to the differential gear mechanism 8. The pulley 6 is in driving relation to the shaft 9, which is rotatably supported by the bearing bushing 34, and which has the driving pinion 10 secured thereto, by means of the lock nuts 36. The pinion 10 is in driving relation to the gears 11 and 12, which are respectively secured to the shafts 13 and 14. The shafts 13 and 14 are carried by the rotatably supported spider 15. One end of each of the shafts is directly supported on the spider by the bearings 16 and 17, and the other ends of the shafts are rotatably supported by the bearing supporting plates 18 and 19, which are removably secured to the flange 38, Figure 4. To provide means whereby the bearing supporting plates may be accurately located with respect to the spider, the flange 36 has formed thereon the internal cylindrical surfaces 41 and 42, which are coaxial with the supporting surfaces of the bearings 16 and 17, and which engage corresponding cylindrical surfaces formed on the bearing plates 18 and 19.

The shafts 13 and 14 also have the gear members 20 and 21 respectively secured thereto, which engage the gear 22, which is pressed on to the cylindrical surface 37, formed on the housing member 23. The pulley 7 is formed directly on the cover member 24, which is removably secured to the housing 23 by the bolts 40.

It is obvious from the construction that when the motor 1 is in operation, the gears 10 and 22 will be driven respectively by the pulleys 6 and 7. The gear 22 is made with a greater diameter than the gear 10, thereby causing the gears 20 and 21 to have a smaller diameter than the gears 11 and 12. It is obvious from the construction that, if the gears 10 and 22 are driven in the same direction at the same speed, the engagement of the gears 20 and 21 with gear 22, and of gears 11 and 12 with gear 10, will lock the spider 15 to the gears 10 and 22, causing the spider to rotate at the same speed, at which the gears 10 and 22 are rotated. However, when the gear 10 is rotated at a greater speed than the gear 22, the shafts 13 and 14 together with the gears secured thereto will rotate about their axes, causing the spider 15 to be driven at a speed less than the speed of rotation of gear 22. Thus if the speed of rotation of the gear 10 is increased and that of the gear 22 is decreased, the speed of rotation of the shafts 13 and 14 will be increased until a condition is arrived at, when the spider 15 is brought to a standstill.

It is thus obvious that if a load driving shaft is attached to the spider 15, the speed of rotation of the load driving shaft may be adjusted by varying the relative speeds at which the gears 10 and 22 are driven. In the present instance the spider 15 has the load driving shaft 25 secured thereto, which projects to the exterior of the housing 23. The load driving shaft 25 is rotatably supported coaxial with the gears 10 and 22 and the shaft 9 by the bearing bushing 35, which is secured to the cover member 24.

To provide means for pivotally supporting the casing 23, the main body of the casing 23 and the cover member 24 are respectively provided with the stub shafts 26 and 27, which are pivotally supported within bearings held by the upright arms 28 and 29. To provide means whereby the housing 23 may be quickly removed from its support, when it is desired to change the driving belt, the bearings on the upright arms are formed in two parts. Thus the stub shaft 27 is rotatably supported by the split bearing bushings 30 and 31, which are respectively held by the upright arm 29 and the bearing cap 32. It is obvious from the construction that, the housing 23 may be quickly removed from its supports, upon the removal of the screws 33, holding the bearing caps to the upright arms 28 and 29.

The removable cover member 24 provides means whereby the gears of the differential transmission may be quickly removed from the enclosing housing 23. The spider 15 is supported on the cover plate 24 by means of the bearing bushing 35, and the shafts 13 and 14, together with the gears secured thereto, are in turn supported by the spider 15. To provide means whereby the cover plate 24 and the spider 15, together with the gears supported thereby, may be removed as a unit from the transmission housing, the flange 38 has the aperture 39 formed therein, having an internal diameter greater than the diameter of the gear 22. Thus when the bolts 40, holding the cover plate 24 to the body member 23, have been removed, the cover plate, together with the spider 15 and the gears supported thereby, may be removed as a unit from the transmission housing. When the spider 15 has been removed from the transmission housing, the shafts 13 and 14, together with the gears supported thereby, may be removed from the spider, upon the removal of the bearing supporting plates 18 and 19.

The manner in which the speed of the load driving shaft 25 is adjusted by means of a variation in the relative speeds at which the pulleys 6 and 7 are driven, has been disclosed. Consider now the means provided for varying the relative speeds of rotation of the pulleys 6 and 7. The pulley 6 is driven by the belt 4 and the pulley 2, which is mounted on the projecting end 43 of the motor shaft. The pulley 2 is of fixed diameter, and may be suitably secured to the motor shaft by the set screw 44 and the key 45. The pulley 6 is an adjustable diameter pulley and includes the pulley sections 46 and 47, which are splined to the shaft 9 by the key 48. The pulley section 46 is axially fixed to the shaft 9 by the set screw 49, and the pulley section 47 is supported for axial movement, to provide means for adjusting the effective pulley diameter. The pulley section 47 is constantly urged toward the pulley section 46 by the compression spring 50, which encompasses the hub of the pulley section, and which is held between the collar 51, secured to the shaft 9, and the shoulder 52 formed on the pulley section.

To provide means for adjusting the effective diameter of the pulley structure, the driving motor 1, together with the pulley 2, is mounted on the sliding base 53, which in turn is supported by the sub-base 54. The movement of the sliding base 53 is guided by the engagement of the tongue members 55 and 56, formed on the sliding base, with the grooves 57 and 58, formed on the sub-base 54. Suitable means are provided for adjusting the position of the sliding base 53 with respect to the sub-base. In the present instance the sliding base 53 has the threaded bushing 59 secured thereto, which threadedly engages the lead screw 60, rotatably supported on the sub-base 54. The lead screw 60 is held against axial movement by the hand wheel 61 and the collar 62, which engage the opposite ends of the bearing bushing 63, secured to the sub-base. It is obvious from the construction that a rotation of the hand wheel 61 results in a corresponding adjustment of the sliding base 53 with respect to the sub-base 54, and in the resultant adjustment of the center distance between the axes of the pulleys 2 and 6.

It is obvious from the construction that an increase in the center distance between the pulleys 2 and 6, produced by a rotation of the hand wheel 61, will result in an increase in the tension of the driving belt 4. An increase in belt tension, in turn, causes the belt to be urged radially inward between the opposing faces of the pulley sections 46 and 47 to decrease the effective diameter of the pulley structure 6. Conversely, a decrease in the center distance will result in a decreased belt tension, which will permit the spring 50 to move the pulley section 47 toward the pulley section 46, to increase the effective diameter of the pulley structure 6.

It is to be noted that when the diameter of the adjustable pulley structure 6 is adjusted, the belt 4 is moved axially over the inclined face of the pulley section 46. Thus when the center distance between the axes of the pulley structures 2 and 6 is increased, to decrease the effective diameter of the pulley structure 6, the belt 4 is moved axially along the inclined face of the pulley section 46 toward the top of the drawing, as viewed in Figure 1. Thus in order to maintain the belt in alignment, it is necessary to move the pulley structure 2 in an axial direction simultaneously with the change in center distance. In the present instance this is accomplished by forming the grooves 57 and 58 on an angle, such that when the center distance is increased, the motor 1, together with the pulley 2, will be moved toward the top of the figure, as viewed in Figure 1, to maintain the belt in alignment.

It is to be noted that the diameter of the adjustable pulley 6 is decreased, when the center distance is increased. The driving motor 1 has a substantially constant speed, thus when the center distance between the pulleys 2 and 6 is increased, the speed of rotation of the shaft 9 and gear 10 will be increased. As has been set forth, when the speed of the pulley 6 is increased with respect to the speed of the pulley 7, the speed of the load driving shaft 25 is decreased. Thus an adjustment of the sliding base 53 to increase the center distance will result in a decrease in the speed of the load driving shaft 25.

To provide means for adjusting the speed of rotation of the gear 22, the fixed diameter pulley 7 is driven by the belt 5 and the adjustable diameter pulley structure 3. The adjustable pulley structure 3 includes the pulley sections 64 and 65, which are splined to the extending end 66 of the motor shaft by the key 67. The pulley section 64 is axially fixed to the motor shaft by the set screw 68, and the pulley section 65 is supported by axial movement. The pulley section 65 is constantly urged toward the pulley section 64 by the compression spring 69, which is held between the collar 70 and the shoulder 71, formed on the pulley section.

It is thus obvious that, the adjustable pulley structure 3 is in every way similar to the adjustable pulley structure 6, mounted on the shaft 9. Thus an increase in the center distance between the pulley structures 3 and 7 will result in a corresponding decrease in the effective diameter of the adjustable pulley structure 3. When the effective diameter of the adjustable pulley structure 3 is decreased, the belt 5 is moved along the inclined face of the pulley section 64 in an axial direction toward the bottom of the drawing, as viewed in Figure 1. Thus if the motor 1, together with the pulley section 64, is moved toward the top of the figure, as viewed in Figure 1, when the center distance is increased, the belt will be maintained in alignment. This obviously is the motion, which is provided by the angular guide, formed by the tongue members 55 and 56 and the grooves 57 and 58, formed on the sub-base 54.

The adjustable diameter pulley 3 is mounted on the motor shaft and thus has a substantially constant speed. As the center distance between the pulleys 3 and 7 is increased, the diameter of the driving pulley 3 is decreased. Thus an increase in the center distance results in a decrease in the speed of rotation of the pulley 7 and of the gear 22 driven thereby.

It is thus obvious that when the sliding base 53 is adjusted to increase the center distance between the driving and driven pulleys, the speed of rotation of the pulley 6 will be increased and the speed of rotation of the pulley 7 will be decreased. Thus an increasing adjustment of the center distance will produce a decrease in the speed of the load driving shaft 25. It is thus obvious that, by means of the construction provided, the speed of the load driving shaft may be adjusted in a continuous manner, during the operation of the drive in a power transmitting capacity, to bring the load driving shaft to a standstill, or to reverse the direction of rotation of the load driving shaft.

Thus if the variable speed drive is employed to drive a machine having a great inertia, the driving motor may be started with the speed of the load driving shaft adjusted to stand still. Then when the motor has come up to speed, the handwheel 61 may be rotated to decrease the center distance between the axis of the motor shaft and the axis of the load driving shaft, to gradually bring the driven machine up to the required speed.

It is to be noted that in the high speed position, which is illustrated by Figure 1, pulleys 6 and 7 and the load driving shaft 25 all rotate in the same direction. Thus the speed of rotation of the gears mounted on the shafts 13 and 14 is reduced to a minimum, thereby greatly increasing the life of the gears and the power capacity of the entire variable speed transmission.

Figures 5 and 6 illustrate another form of differential gear mechanism, which may be employed with the adjustable pulleys and driving motor structure, illustrated by Figure 1. In this form the differential gear mechanism 72 is enclosed within the housing 73, formed by the casing member 74 and the cover member 24. As in the construction of Figure 1, the housing 73 is rotatably supported on the upright arms 28 and 29, by means of the stub shaft 75, formed on the member 74, and the stub shaft 27 formed on the cover member 24. In this form the differential gear mechanism is actuated by the pinion 76, mounted on the shaft 9, and by the ring gear 77, which is pressed into the casing member 74 and suitably locked in place, as by means of the split ring 78. The pinion 76 drives the idler gears 79 and 80, which are rotatably supported on the stub shafts 81 and 82, secured to the spider member 83. The idler gears 79 and 80 respectively engage the gears 84 and 85, mounted on the stub shafts 86 and 87, secured to the spider member 83. The gears 84 and 85, in turn, engage the ring gear 77. The spider 83 has the load driving shaft 88 secured thereto, which is rotatably supported on the cover member 24 by the bearing bushing 35.

It is obvious from the construction that, if the pinion 76 and the ring gear 77 are both driven in the same direction at the same speed, the gears 79 and 84 and the gears 80 and 85 will be locked against rotation. Thus the spider 83 will be driven in the same direction as the gears 76 and 77 and at the same speed. When the pinion 76 is rotated at a greater speed than the ring gear 77, the gears 84 and 85 will be rotated in the direction of rotation of the pinion 76. The engagement of the gears 84 an 85 with the ring gear 77 then causes the spider 83 to be driven, in the direction of rotation of the ring gear 77, at a speed less than that of the ring gear. It is obvious that, if the speed of rotation of the pinion 76 is increased, and the speed of rotation of the ring gear 77 decreased, a condition will arise at which, the spider 83 will be brought to a standstill.

As in the construction of Figure 1, the adjustable diameter pulley 6 is driven by the fixed diameter pulley 2 and the fixed diameter pulley 7 is driven by the adjustable diameter pulley 3. Thus in the position illustrated by Figure 5, the pulley 6 is being rotated at its minimum speed, and the pulley 7 at its maximum speed. This position of the pulley structures thus corresponds to a maximum speed of rotation of the load driving shaft 88. For when the center distance is increased, to decrease the effective diameters of the pulley structures, the speed of rotation of the pinion 76 will be increased and the speed of rotation of the ring gear 77 will be decreased, to decrease the speed of rotation of the load driving shaft 88.

As in the construction of Figure 1, the differential gear housing 73 may be quickly removed from its support, by removing the bearing caps holding the stub shafts 75 and 27 to the upright arms 28 and 29. The spider 73, together with the gears supported thereby, may then be removed from the gear housing, by removing the bolts 40, holding the cover member 24 to the casing member 74.

Gears 79, 80, 84 and 85 are in turn removably secured to the spider 83 by the stub shafts 81, 82, 86 and 87. As illustrated by Figure 5, each of the stub-shafts is secured to the spider by means of a nut which engages a threaded end of the stub shaft. Thus the stub shaft 86 is provided with the threaded end 90, which together with the nut 89, provides means for holding the stub shaft to the spider. Each of the gears is rotatably supported on its shaft by means of a bearing bushing, which is held between the head of the stub shaft and the face of the spider. Thus the gear 84 is provided with a bearing bushing 92, which is pressed into the gear, and which is held between the head 91 of the stub shaft 86 and the face of the spider 83. It is obvious from the construction that each of the gears may be removed from the supporting spider by removing the nut, engaging the threaded end of the stub shaft.

It is to be noted that, as in the construction of Figure 1, when the speed of rotation of the load driving shaft 88 is increased, the speed of rotation of the gears, supported on the spider, is decreased. Thus by means of the construction provided, the life of the transmission gears and the power capacity of the differential gear mechanism are increased to a maximum.

Figure 8:
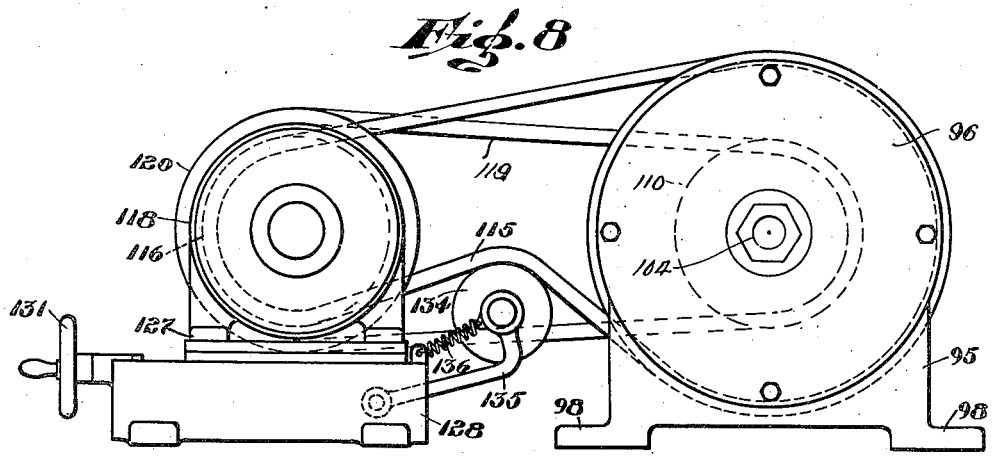
Figure 8 is a side elevation, taken from the front of Figure 7.

Figures 7 and 8 illustrate another form of variable speed differential drive, embodying the invention. In this form the differential gear mechanism 93 is enclosed within the housing 94, formed by the casing member 95 and the cover member 96. The cover member 96 is removably secured to the casing member 95 by the bolts 97, and the entire differential gear mechanism is supported by the feet 98, formed on the casing member 95. The differential gear mechanism is actuated by the driving pinion 99 and by the spider 100, having the gears 101 and 102 rotatably supported thereon. The gears 101 and 102 engage the pinion 99 and the ring gear 103, which is secured to the load driving shaft 104.

The load driving shaft 104 is rotatably supported by the bearing bushing 105, secured to the cover member 96. The pinion 99 and the spider 100 are rotatably supported, in coaxial relation to the load driving shaft, by the shafts 106 and 107. The shaft 107 is supported on the casing member 95 by the bearing bushing 108. The shaft 106 is rotatably supported by the bearing bushings 109, which are secured to the shaft 107. The shaft 106 has the fixed diameter pulley 110 mounted thereon, which is suitably secured to the shaft by the set screw 111 and the key 112. The shaft 107 is driven by the pulley 113, which is suitably keyed to the shaft, and held against axial movement by the set screw 114. Thus the pulley 110 is in driving relation to the pinion 99 and the pulley 113 is in driving relation to the spider 100.

If the pulleys 110 and 113 are driven in the same direction at the same speed, the gears 101 and 102 will be locked against rotation. The engagement of the gears 101 and 102 with the ring gear 103 will cause the ring gear to be rotated with the pulleys 110 and 113 and at the same speed. Thus for this condition, the load driving shaft 104 will be driven at the speed of rotation of the pulleys 110 and 113. If the speed of the pulley 113 is maintained constant, and the speed of rotation of the pulley 110 is increased, so that the pinion 99 is rotated at a greater speed than the spider 100, the gears 101 and 102 will be rotated about their axes in a direction opposite to the rotation of the pinion 99. It is thus obvious that the ring gear 103 will then be driven at a speed less than the speed of rotation of the spider 100. If the speed of rotation of the pinion 99 is further increased, a condition will arise when, the gears 101 an 102 are rotated at a sufficiently high speed to bring the ring gear 103 to a standstill. A further increase in the speed of the pinion 99 will then result in a reversal in the direction of rotation of the load driving shaft 104.

The pulley 113 is driven by the belt 115 and the fixed diameter pulley 116, mounted on the shaft 117 of the driving electric motor 118. The pulley 110 is driven by the belt 119 and by the adjustable diameter pulley structure 120. The adjustable diameter pulley 120 includes the pulley sections 121 and 122, which are keyed to the motor shaft by the key 123 and which are supported for axial movement. The pulley section 122 is urged into driving relation with the belt by the spring 124, which is held between the pulley 116 and the reverse side of the pulley section 122. The pulley section 121 is urged into driving relation with the belt by the spring 125, which is held between the collar 126, secured to the motor shaft, and a shoulder formed on the pulley section.

To provide means for adjusting the effective diameter of the adjustable pulley structure 120, the driving electric motor 118 is mounted on the sliding motor base 127, which, in turn, is supported on the sub-base 128. Suitable means are provided for adjusting the position of the sliding motor base to vary the center distance between the driving and driven pulleys of the variable speed drive. In the present instance, the adjustment of the center distance is effected by the rotation of the lead screw 130, which threadedly engages the threaded bushing 129, secured to the sliding base 127. The lead screw is rotatably supported on the sub-base 128 and is provided with the manipulating hand wheel 131.

It is obvious from the construction that, when the hand wheel 131 is rotated to increase the center distance, the belt 119 will urge the pulley sections 121 and 122 apart, to decrease the effective diameter of the pulley structure 120. Conversely, a decrease in the center distance will result in an increase in the effective diameter of the pulley structure. In the present instance, both pulley sections of the adjustable pulley structure are axially adjusted. Thus there is no tendency to throw the driving belt out of alignment, when the diameter of the pulley structure is adjusted. The grooves 132 and 133, formed on the sub-base for guiding the motion of the sliding base 127, are accordingly formed so that they move the supported motor 118 in a direction parallel to the length of the belt 119.

The pulleys 113 and 116 have a fixed effective diameter. It is accordingly necessary to provide means for taking up the belt slack, when the center distance between the pulleys is adjusted. In the present instance the idler pulley 134 is provided, which is rotatably supported on the arm 135, pivotally supported on the sub-base 128. The pulley 134 is constantly urged into engagement with the back of the driving belt 115 by the tension spring 136, which is anchored to the sub-base 128 and fastened to the arm 135. It is obvious from the construction that, the spring 136 constantly urges the arm 135 in an upward direction to hold the idler pulley 134 against the belt 115.

It is obvious from the construction that, when the center distance between the driving and driven pulleys is increased, the diameter of the adjustable pulley structure 120 will be decreased, thereby decreasing the speed of rotation of the pulley 110. As has been previously set forth, a decrease in the speed of rotation of the pulley 110 results in an increase in the speed of rotation of the load driving shaft 104. Thus when the hand wheel 131 is rotated to increase the center distance, the speed of the load driving shaft 104 will be increased, and conversely, a decrease in the center distance will result in a decreased speed of rotation of the load driving shaft.

It is to be noted that in each of the forms disclosed the speed of rotation of the gear members is decreased, when the speed of the load driving shaft is increased. Thus under normal conditions of operation, the gears of the differential gear mechanism operate at a very slow speed. By means of this construction the life and power capacity of the entire variable speed transmission is increased.

I claim:

1. In a variable speed drive, a planetary gear mechanism having two actuating members and a driven member, a load driving means engaged by the driven member of said planetary gear mechanism, a pair of pulley structures in respective driving relation to each of said actuating members, an electric motor having a shaft, a pair of pulley structures mounted on said motor shaft, a pair of belts for transmitting power between the pulley structures mounted on said motor shaft and the pulley structures in driving relation to said actuating members, one of said pulley structures mounted on said motor shaft having a fixed diameter and the other of said pulley structures having an adjustable effective diameter and including a pair of pulley sections with opposed inclined faces, forming by relative axial adjustment variable effective pulley diameters, means for adjustably mounting said motor to vary the center distance between the axis of said adjustable pulley structure and the axis of the pulley structure in driving relation thereto, and means for adjusting the effective diameter of said adjustable pulley structure in accordance with the adjustment of said center distance, whereby the speed of one of said actuating members may be altered with respect to the speed of the other of said actuating members.

2. In a variable speed drive, a planetary gear mechanism having two actuating members and a driven member, said actuating members and said driven member being relatively rotatable above a common axis, a load driving means engaged by the driven member of said planetary gear mechanism, a pair of pulley structures coaxial with said planetary gear mechanism and in respective driving relation to each of said actuating members, an electric motor having a shaft, a pair of pulley structures mounted on said motor shaft, a pair of belts for transmitting power between the pulley structures mounted on said motor shaft and the pulley structures in driving relation to said actuating members, one of said pulley structures mounted on said motor shaft having a fixed diameter and the other of said pulley structures having an adjustable effective diameter and including a pair of pulley sections with opposed inclined faces, forming by relative axial adjustment variable effective pulley diameters, means for adjustably mounting said motor to vary the center distance between the axis of said motor shaft and the axis of said differential gear mechanism, and means for adjusting the effective diameter of said adjustable pulley structure in accordance with the adjustment of said center distance, whereby the speed of one of said actuating members may be altered with respect to the speed of the other of said actuating members.

3. In a variable speed drive, a planetary gear mechanism having two actuating members and a driven member, said actuating members and said driven member being relatively rotatable about a common axis, a load driving means engaged by said driven member, a pair of pulley structures mounted coaxial with said planetary gear mechanism and in respective driving relation to each of said actuating members, one of said pulley structures having a fixed diameter and the other of said pulley structures having an adjustable effective diameter, an electric motor having a shaft, a pair of pulley structures mounted on said motor shaft, one of said pulley structures mounted on said motor shaft having an adjustable effective diameter, and a pair of belts for transmitting power between the pulley structures mounted on said motor shaft and the pulley structures mounted coaxial with the differential gear mechanism, each of said belts being in driving relation with one of said adjustable pulley structures, whereby a simultaneous adjustment of the effective diameters of said adjustable pulley structures results in a corresponding adjustment of the speed of both of said actuating members, the adjustment in the ratio of transmission to one of said actuating members being different from the simultaneous adjustment in the ratio of transmission to the other of said actuating members.

4. In a variable speed drive, a planetary gear mechanism having two actuating members and a driven member, a load driving means engaged by said driven member, a pair of pulley structures in respective driving relation to each of said actuating members, one of said pulley structures having an adjustable effective pulley diameter, and the other of said pulley structures having a fixed effective diameter, a driving shaft, a pair of pulley structures mounted on said driving shaft, one of said pulley structures mounted on said driving shaft having an adjustable effective diameter and the other pulley structure having a fixed effective diameter, a pair of belts for transmitting power between the pulley structures mounted on said driving shaft and the pulley structures in driving relation to said actuating members, each of said belts being in driving relation with one of said adjustable pulley structures and one of said fixed diameter pulley structures, means for adjustably mounting said driving shaft to vary the center distance between the axes of the pulley structures in driving relation with each of said belts, and means for adjusting the effective diameter of each of said adjustable pulley structures in accordance with the adjustment of said center distance, whereby the operating speeds of said actuating members are adjusted in opposite directions to adjust the speed of said load driving means.

5. In a variable speed drive, a planetary gear mechanism having two actuating members and a driven member, a load driving means engaged by said driven member, a pair of pulley structures in respective driving relation to each of said actuating members, one of said pulley structures having an adjustable effective diameter, and the other of said pulley structures having a fixed effective diameter, an electric motor having a shaft, a pair of pulley structures mounted on said motor shaft, one of said pulley structures mounted on said motor shaft having an adjustable effective diameter and the other pulley structure having a fixed effective diameter, a pair of belts for transmitting power between the pulley structures mounted on said motor shaft and the pulley structures in driving relation to said actuating members, each of said belts being in driving relation with one of said adjustable pulley structures and one of said fixed diameter pulley structures, means for adjustably mounting said electric motor to vary the center distance between the axes of the pulley structures in driving relation with each of said belts, and means for adjusting the effective diameters of said adjustable pulley structures, whereby the speed of operation of one of said actuating members is increased and the speed of operation of the other of said actuating members is decreased to adjust the speed of said load driving means.

6. In a variable speed drive, a planetary gear mechanism having two actuating members and a driven member, a load driving means engaged by said driven member, a pair of pulley structures in respective driving relation to each of said actuating members, one of said pulley structures having an adjustable effective diameter and the other of said pulley structures having a fixed effective diameter, a driving shaft, a pair of pulley structures mounted on said driving shaft, one of said pulley structures mounted on said driving shaft having an adjustable effective diameter and the other pulley structure having a fixed effective diameter, a pair of belts for transmitting power between the pulley structures mounted on said driving shaft and the pulley structures in driving relation to said actuating members, each of said belts being in driving relation with one of said adjustable pulley structures and one of said fixed diameter pulley structures, each of said adjustable pulley structures including an axially fixed pulley section and a pulley section axially adjustable with respect to the fixed pulley section, said pulley sections having opposed inclined faces, whereby an axial adjustment of the axially adjustable pulley section results in a corresponding variation in the effective diameter of the adjustable pulley structure and in an axial movement of the driving belt with respect to the fixed pulley section, means for adjustably mounting said driving shaft for movement in a direction to adjust the center distance between the axes of the pulley structures in driving relation with each of said belts, as well as in a direction to maintain the belts in substantial alignment.

7. In a variable speed drive, a planetary gear mechanism having two actuating members and a driven member, a load driving means engaged by the driven member of said planetary gear mechanism, a pair of variable speed power transmissions in respective driving relation to each of said actuating members, to drive both of them in the same direction, each of said variable speed transmissions including an adjustable diameter pulley structure, a fixed diameter pulley structure and a belt for transmitting power between said pulley structures, a driving shaft in driving relation to said variable speed transmissions, and means for adjusting the effective diameters of each of said adjustable pulley structures to increase the operating speed of one of said actuating members and decrease the operating speed of the other of said actuating members to adjust the speed of said load driving means.

8. In a variable speed drive, a planetary gear mechanism having two actuating members and a driven member, said actuating members and said driven member being relatively rotatable about a common axis, a casing enclosing and providing means for supporting said planetary gear mechanism, means for rotatably supporting said casing for rotation about said common axis, a load driving shaft rotatably supported coaxially with said casing and connected to said driven member, a shaft rotatably supported coaxially with said planetary gear mechanism and engaging one of said actuating members, means for securing the other of said actuating members to said casing to rotate therewith, a pair of power transmission means in respective driving relation to said casing and to said shaft, to drive them in the same direction, and means for adjusting the speed ratio of both of said power transmission means.

9. In a variable speed drive, a planetary gear mechanism having two actuating members and a driven member, said actuating members and said driven member being relatively rotatable about a common axis, a casing enclosing and providing means for supporting said planetary gear mechanism, means for rotatably supporting said casing for rotation about said common axis, means for securing one of said actuating members to said casing, a load driving shaft connected to said driven member and rotatably supported coaxially with said casing, a pair of pulley structures supported coaxially with said planetary gear mechanism, one of said pulley structures being connected to said casing and the other of said pulley structures being in driving relation to the other of said actuating members, a driving shaft, a pair of pulley structures mounted on said driving shaft, a pair of belts in driving relation to said pulley structures mounted on said driving shaft and to said pulley structures coaxial with the planetary gear mechanism, said structures coaxial with the planetary gear mechanism being rotated in the same direction, one of the pulley structures in driving relation with each of said belts having an adjustable effective diameter, and means to adjust simultaneously the effective diameters of said adjustable pulley structures, the pulley structures being such that the adjustment in the ratio of drive between one pair of pulley structures is different from the simultaneous adjustment in the ratio of drive between the other pair of pulley structures.

10. In a variable speed drive, a planetary gear mechanism having two actuating members and a load driving member, a pair of power transmitting means in respective driving relation to each of said actuating members, to rotate them in the same direction, a shaft for operating both of said power transmitting means, one of said power transmitting means including a pair of pulley structures as well as a belt, one of said pulley structures having a variable effective pulley diameter, means for varying the center distance between the axes of said pulley structures, and means for adjusting the effective diameter of said pulley structure in accordance with the variation of said center distance, the other power transmitting means including a pair of pulley structures as well as a belt connecting the pulley structures, the pulley structures being such that as the center distance is varied, the increment or decrement in the speed of one actuating member is different from the increment or decrement in the speed of the other actuating member.

11. In a variable speed drive, a device for compounding motion having two actuating members and a driven member, a load driving means engaged by the driven member, a pair of power transmission means in respective driving relation to each of said actuating members, a driving shaft for operating said pair of power transmission means, each of said power transmission means including a driving pulley structure, a driven pulley structure and a belt for transmitting power between said pulley structures, at least one of all said pulley structures including a pair of pulley sections with opposed inclined faces, forming by relative axial adjustment variable effective pulley diameters, said variable effective diameter pulley being in coaxial driving relation to one of the actuating members whereby the speed ratio of one of said power transmission means may be varied with respect to the speed ratio of the other power transmission means, means for adjustably mounting said driving shaft to vary the distance between the axes of said driving pulley structures and said driven pulley structures, and means for adjusting the effective diameter of said adjustable pulley structure in accordance with the adjustment of said center distance.

12. In a variable speed drive, a device for compounding motion, having two actuating members and a driven member, a pair of power transmission means in respective driving relation to each of said actuating members, a driving shaft for operating said pair of power transmission means, each of said power transmission means including a driving pulley structure, a driven pulley structure, and a belt for transmitting power between said pulley structures, at least one of all said pulley structures including a pair of pulley sections with opposed inclined faces, forming by relative axial adjustment variable effective pulley diameters, said variable effective diameter pulley being in coaxial driving relation to one of the actuating members, whereby the relative speeds at which said actuating members are operated may be varied, said driving pulley structures being mounted on the driving shaft, an electric motor in driving relation to said shaft, means for adjustably mounting said electric motor and said shaft to vary the distance between the axes of said driving pulley structures and said driven pulley structures, and means to vary the effective diameter of said adjustable pulley structure.

13. In a variable speed drive, a device for compounding motion having two actuating members and a driven member, a load driving means engaged by said driven member, a pair of variable speed power transmissions in respective driving driving relation to each of said actuating members, each of said variable speed transmissions including an adjustable diameter pulley structure, a fixed diameter pulley structure and a belt for transmitting power between said pulley structures, said adjustable diameter pulley structures being independent of each other, whereby the belts may be kept in substantially perfect alinement with their respective pulley structures for all adjustments of said adjustable diameter pulley structures, and means for simultaneously adjusting the effective diameters of said adjustable pulley structures to vary the rates of transmission in each of said power transmission means, the adjustment in the rate of transmission to one of said actuating members being different from the simultaneous adjustment in the rate of transmission to the other of said actuating members.

14. In a variable speed drive, a device for compounding motion having two actuating members and a driven member, a load driving means engaged by said driven member, a pair of variable speed power transmissions in respective driving relation to each of said actuating members, each of said variable speed transmissions including an adjustable diameter pulley structure, a fixed diameter pulley structure and a belt for transmitting power between said pulley structures, said adjustable pulley structures being on different shafts, whereby the belts may be kept in substantially perfect alinement with their respective pulley structures for all adjustments of said adjustable diameter pulley structures, and means for simultaneously adjusting the effective diameters of said adjustable pulley structures to vary the rates of transmission in each of said power transmission means, the adjustment in the rate of transmission to one of said actuating members being different from the simultaneous adjustment in the rate of transmission to the other of said actuating members.

15. In a variable speed drive, a device for compounding motion having two actuating members and a load driving member, a pair of power transmitting means in respective driving relation to each of said actuating members, a shaft for operating both of said power transmitting means, a source of power for actuating said shaft, each of said power transmitting means including a pair of pulley structures as well as a belt, at least one of all said pulley structures having a variable effective diameter, means to adjust the center distance between the shaft and the load driving members to vary the ratio of drive in one transmission means with respect to the ratio of drive in the other transmission means, said power transmitting means being disposed respectively on opposite sides of said source of power.

16. In a variable speed drive, a device for compounding motion having two actuating members and a driven member, a load driving means engaged by the driven member, a pair of power transmission means in respective driving relation to each of the actuating members, for rotating them in the same direction, a driving shaft for operating said pair of power transmission means, said pair of power transmission means including means whereby the speed of one of said actuating members may be altered with respect to the speed of the other of said actuating members in response to variations in the center distance between said shaft and said actuating members, and means to vary the distance between the shaft and the actuating members.

DON HEYER.